(12) United States Patent
Mitsuki

(10) Patent No.: US 7,907,350 B2
(45) Date of Patent: Mar. 15, 2011

(54) ZOOM LENS SYSTEM, IMAGING APPARATUS, METHOD FOR ZOOMING, AND METHOD FOR VIBRATION REDUCTION

(75) Inventor: Shinichi Mitsuki, Kanagawaken (JP)

(73) Assignee: Nikon Corporation, Tokyo (JP)

( * ) Notice: Subject to any disclaimer, the term of this patent is extended or adjusted under 35 U.S.C. 154(b) by 302 days.

(21) Appl. No.: 12/299,748

(22) PCT Filed: Jul. 25, 2007

(86) PCT No.: PCT/JP2007/065029
§ 371 (c)(1),
(2), (4) Date: Nov. 5, 2008

(87) PCT Pub. No.: WO2008/013307
PCT Pub. Date: Jan. 31, 2008

(65) Prior Publication Data
US 2009/0219619 A1    Sep. 3, 2009

(30) Foreign Application Priority Data

Jul. 27, 2006  (JP) .................................. 2006-205035

(51) Int. Cl.
*G02B 15/14*  (2006.01)
*G02B 27/64*  (2006.01)
(52) U.S. Cl. ..................... 359/684; 359/676; 359/557
(58) Field of Classification Search ............ 359/557, 359/676, 683, 684, 686, 687
See application file for complete search history.

(56) References Cited

U.S. PATENT DOCUMENTS

| 6,754,446 B2 | 6/2004 | Hagimori et al. |
| 2005/0225646 A1 | 10/2005 | Shintani |
| 2005/0275948 A1 | 12/2005 | Sueyoshi |
| 2006/0051082 A1 | 3/2006 | Tamura |
| 2006/0066955 A1 | 3/2006 | Satori et al. |
| 2009/0046366 A1* | 2/2009 | Take .............................. 359/557 |

FOREIGN PATENT DOCUMENTS

| JP | 2000-131610 A | 5/2000 |
| JP | 2005-84283 A | 3/2005 |
| JP | 2005-091465 A | 4/2005 |
| JP | 2005-181635 A | 7/2005 |
| JP | 2005-195757 A | 7/2005 |
| JP | 2005-352347 A | 12/2005 |
| JP | 2006-98686 A | 4/2006 |

* cited by examiner

*Primary Examiner* — David N Spector
(74) *Attorney, Agent, or Firm* — Miles & Stockbridge P.C.

(57) ABSTRACT

Providing a high optical performance zoom lens system with realizing a high zoom ratio and compactness suitable for a highly integrated electronic imaging device. The system includes, in order from an object along an optical axis: a first group G1 having positive refractive power; a second group G2 having negative refractive power; a third group G3 having positive refractive power; a fourth group G4 having positive refractive power; and a fifth group G5 having negative refractive power. Upon zooming from a wide-angle end state W to a telephoto end state T, the second group G2 and the fourth group G4 are moved along the optical axis. The first group G1 includes, in order from the object along the optical axis, a front group G1f having negative refractive power, an optical-path-bending element P for bending an optical path, and a rear group G1r having positive refractive power. Given expression is satisfied.

35 Claims, 11 Drawing Sheets

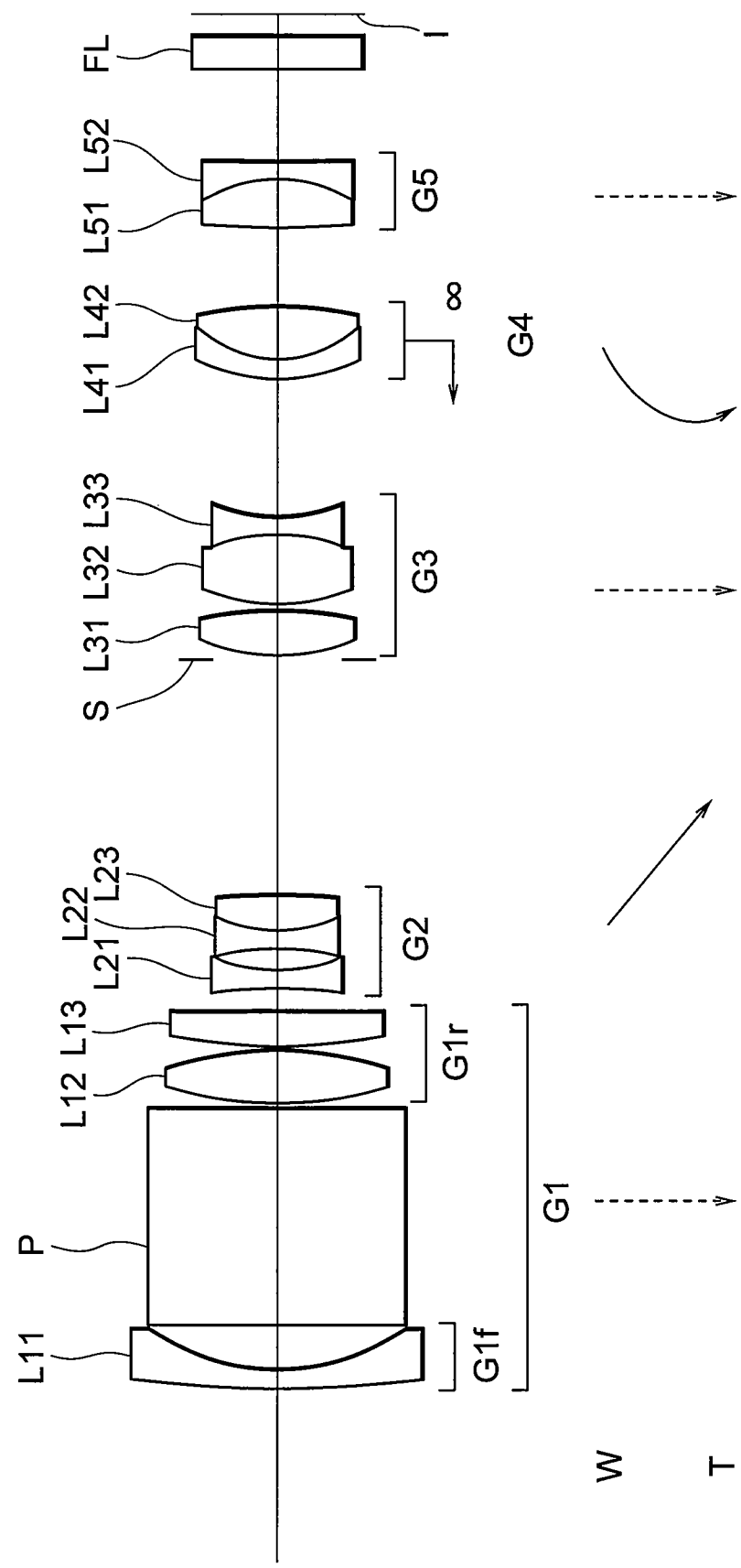

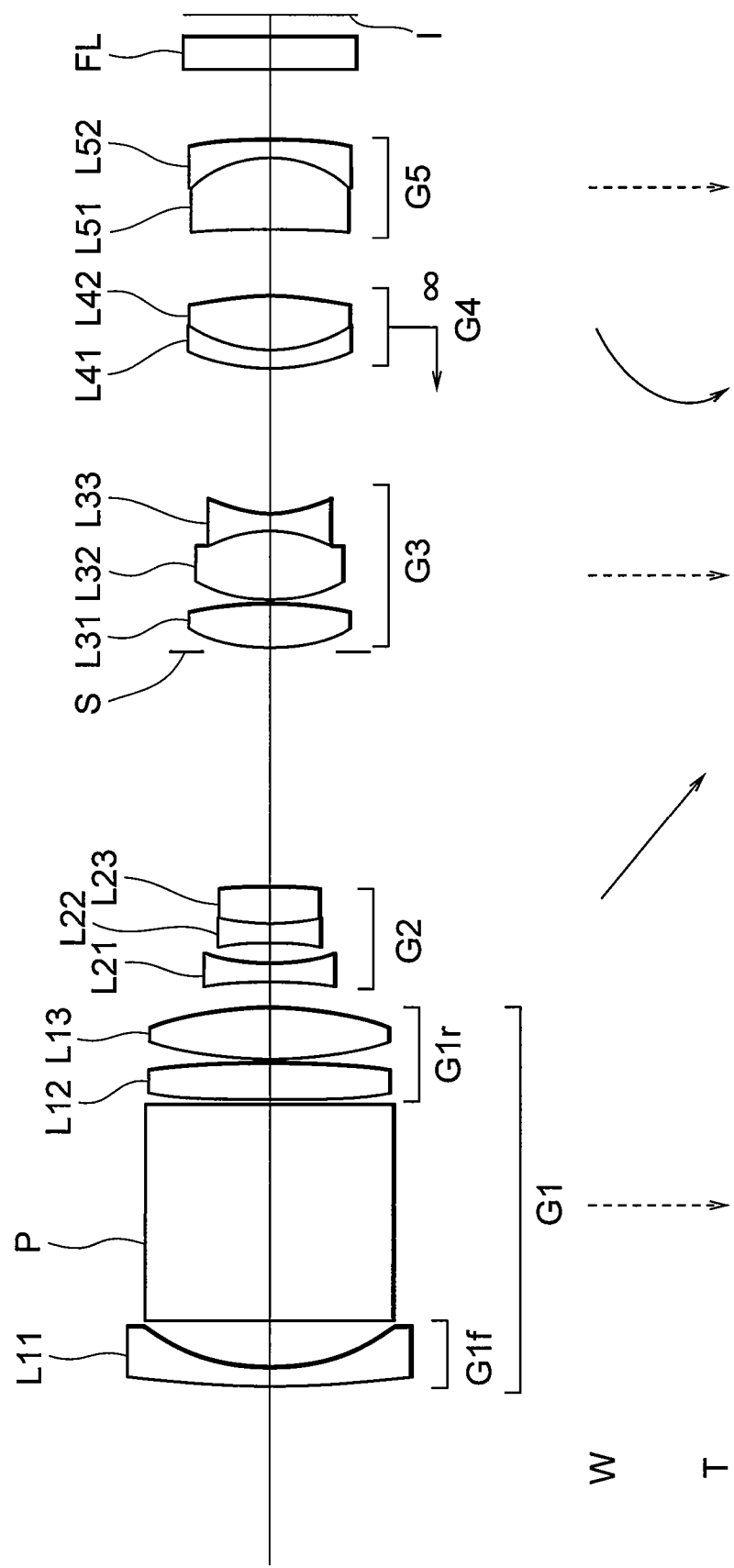

ZOOM LENS SYSTEM, IMAGING APPARATUS, METHOD FOR ZOOMING, AND METHOD FOR VIBRATION REDUCTION

TECHNICAL FIELD

The present invention relates to a zoom lens system, an imaging apparatus, a method for zooming the zoom lens system, and a method for vibration reduction of the zoom lens system.

BACKGROUND ART

A camera such as an electronic still camera that outputs an object image by using an imaging device such as an electronic imaging device and stores it as a digital image has been mostly used. Recently, electronic imaging devices have been miniaturized and highly integrated, so that even a highly integrated one has been available at a reasonable price. Moreover, since it has been miniaturized by high integration, a lens system installed in a camera using such an electronic imaging device has also been miniaturized.

However, when a zoom lens system is adopted in such a camera, and when a zoom ratio of the zoom lens system is tried to be large, in consideration of aberration correction of each lens group composing the zoom lens system, the number of lenses increases, and the thickness of each lens group becomes large, so that the total lens length also becomes large. Accordingly, although there is a certain limit to miniaturization of a zoom lens system or a camera, recently demand for miniaturization has become higher taking a serious view of design and portability of a camera.

With this background, there has been proposed a method for miniaturizing a zoom lens system by disposing an optical-path-bending element for bending the optical path in the zoom lens system. More specifically, there has been proposed a zoom lens system having a zoom ratio of about three composed of, in order from an object along an optical axis, a first lens group having positive refractive power, a second lens group having negative refractive power, a third lens group having positive refractive power, and a fourth lens group having positive refractive power, and a prism for bending an optical path being disposed in the first lens group (see Japanese Patent Application Laid-Open No. 2000-131640).

When an optical-path-bending element for bending an optical path is disposed in a zoom lens system, in order to shorten the length of the zoom lens system in the depth direction, in other words, an incident light direction, it is most effective to dispose the optical-path-bending element in the first lens group. In this case, when the optical-path-bending element is made to be compact, the dimension of the zoom lens system in the depth direction can be further smaller.

However, in order to make the zoom lens system become a high zoom ratio, since the total lens length necessary for zooming becomes large, the lens diameter of the first lens group has to be large. Accordingly, the optical-path-bending element has to be large, so that the length in the depth direction cannot be reduced.

Although the conventional zoom lens system has made it possible to shorten the length in the depth direction by disposing an optical-path-bending element in the first lens group, the zoom ratio has been small, and the prism has not been sufficiently small.

DISCLOSURE OF THE INVENTION

The present invention is made in view of the aforementioned problems and has an object to provide a high optical performance zoo lens system with realizing a high zoom ratio and compactness suitable for a highly integrated electronic imaging device, an imaging apparatus, a method for zooming the zoom lens system, and a method for vibration reduction of the zoom lens system.

According to a first aspect of the present invention, there is provided a zoom lens system comprising, in order from an object along an optical axis: a first lens group having positive refractive power; a second lens group having negative refractive power; a third lens group having positive refractive power; a fourth lens group having positive refractive power; and a fifth lens group having negative refractive power, upon zooming from a wide-angle end state to a telephoto end state, the second lens group and the fourth lens group being moved along the optical axis, the first lens group including, in order from the object along the optical axis, a front lens group having negative refractive power, an optical-path-bending element for bending an optical path, and a rear lens group having positive refractive power, and the following conditional expression (1) being satisfied:

$$0.75 < (fw \cdot ft)^{1/2}/(-fn1) < 0.95 \tag{1}$$

where fw denotes a focal length of the zoom lens system in the wide-angle end state, ft denotes a focal length of the zoom lens system in the telephoto end state, and fn1 denotes a focal length of the front lens group in the first lens group.

According to a second aspect of the present invention, there is provided a zoom lens system comprising, in order from an object along an optical axis: a first lens group having positive refractive power; a second lens group having negative refractive power; a third lens group having positive refractive power; a fourth lens group having positive refractive power; and a fifth lens group having negative refractive power, upon zooming from a wide-angle end state to a telephoto end state, the second lens group and the fourth lens group being moved along the optical axis, the first lens group including an optical-path-bending element for bending an optical path, and the third lens group being movable in a direction substantially perpendicular to the optical axis.

According to a third aspect of the present invention, there is provided an imaging apparatus equipped with the zoom lens system according to the first aspect or the second aspect.

According to a fourth aspect of the present invention, there is provided a method for zooming a zoom lens system comprising steps of: providing the zoom lens system including, in order from an object along an optical axis, a first lens group having positive refractive power, a second lens group having negative refractive power, a third lens group having positive refractive power, a fourth lens group having positive refractive power, and a fifth lens group having negative refractive power; providing the first lens group including, in order from the object along the optical axis, a front lens group having negative refractive power, an optical-path-bending element for bending an optical path, and a rear lens group having positive refractive power; satisfying the following conditional expression (1):

$$0.75 < (fw \cdot ft)^{1/2}/(-fn1) < 0.95 \tag{1}$$

where fw denotes a focal length of the zoom lens system in the wide-angle end state, ft denotes a focal length of the zoom lens system in the telephoto end state, and fn1 denotes a focal length of the front lens group in the first lens group; and moving the second lens group and the fourth lens group along the optical axis upon zooming from a wide-angle end state to a telephoto end state.

According to a fifth aspect of the present invention, there is provided a method for zooming a zoom lens system comprising steps of: providing the zoom lens system including, in order from an object along an optical axis, a first lens group having positive refractive power, a second lens group having negative refractive power, a third lens group having positive refractive power, a fourth lens group having positive refractive power, and a fifth lens group having negative refractive power; providing the first lens group including an optical-path-bending element for bending an optical path; moving the third lens group in a direction substantially perpendicular to the optical axis; and moving the second lens group and the fourth lens group along the optical axis upon zooming from a wide-angle end state to a telephoto end state.

The present invention makes it possible to provide a high optical performance zoom lens system with realizing a high zoom ratio and compactness suitable for a highly integrated electronic imaging device, an imaging apparatus, a method for zooming the zoom lens system, and a method for vibration reduction of the zoom lens system.

BRIEF DESCRIPTION OF THE DRAWINGS

FIG. 1 is a sectional view showing lens configuration of a zoom lens system according to Example 1 together with a zooming trajectory of each lens group.

FIGS. 2A, 2B and 2C are graphs showing various aberrations of the zoom lens system according to Example 1 upon focusing on an infinity object without performing vibration reduction, in which FIG. 2A is in a wide-angle end state, FIG. 2B is in an intermediate focal length state, and FIG. 2C is in a telephoto end state.

FIGS. 3A, 3B and 3C are graphs showing coma of the zoom lens system according to Example 1 upon focusing on an infinity object with vibration reduction, in which FIG. 3A is in a wide-angle end state, FIG. 3B is in an intermediate focal length state, and FIG. 3C is in a telephoto end state.

FIGS. 5A, 5B and 5C are graphs showing various aberrations of the zoom lens system according to Example 2 upon focusing on an infinity object without performing vibration reduction, in which FIG. 5A is in a wide-angle end state, FIG. 5B is in an intermediate focal length state, and FIG. 5C is in a telephoto end state.

FIGS. 6A, 6B and 6C are graphs showing coma of the zoom lens system according to Example 2 upon focusing on an infinity object with vibration reduction, in which FIG. 6A is in a wide-angle end state, FIG. 6B is in an intermediate focal length state, and FIG. 6C is in a telephoto end state.

FIG. 7 is a sectional view showing lens configuration of a zoom lens system according to Example 3 together with a zooming trajectory of each lens group.

FIGS. 8A, 8B and 8C are graphs showing various aberrations of the zoom lens system according to Example 3 upon focusing on an infinity object without performing vibration reduction, in which FIG. 8A is in a wide-angle end state, FIG. 8B is in an intermediate focal length state, and FIG. 8C is in a telephoto end state.

FIGS. 9A, 9B and 9C are graphs showing coma of the zoom lens system according to Example 3 upon focusing on an infinity object with vibration reduction, in which FIG. 9A is in a wide-angle end state, FIG. 9B is in an intermediate focal length state, and FIG. 9C is in a telephoto end state.

FIGS. 10A and 10B are diagrams showing a camera equipped with a zoom lens system according to present embodiment, in which FIG. 10A is a front view, and FIG. 10B is a rear view.

THE BEST MODE FOR CARRYING OUT THE INVENTION

Figure 2A:
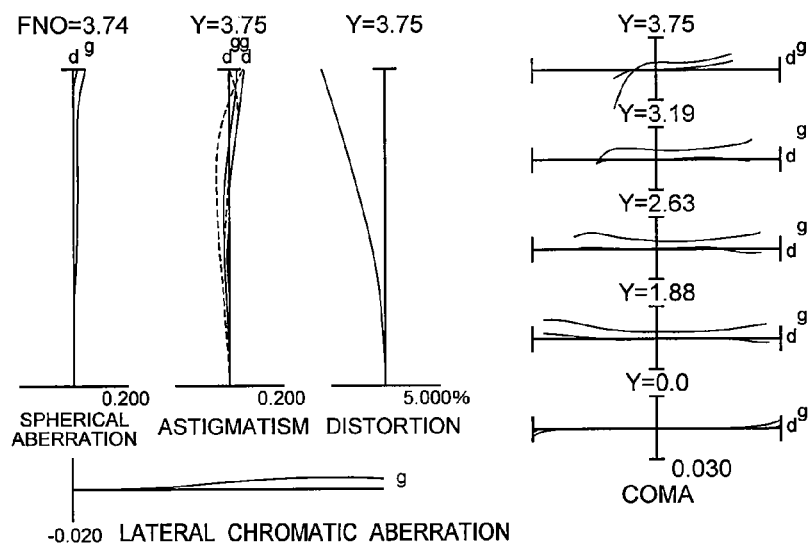

A zoom lens system, an imaging apparatus, a method for zooming the zoom lens system, and a method for vibration reduction of the zoom lens system according to the present embodiment are explained below.

A zoom lens system according to the present embodiment includes, in order from an object along an optical axis, a first lens group having positive refractive power, a second lens group having negative refractive power, a third lens group having positive refractive power, a fourth lens group having positive refractive power, and a fifth lens group having negative refractive power. Upon zooming from a wide-angle end state to a telephoto end state, the second lens group and the fourth lens group are moved along the optical axis. The first lens group includes, in order from the object along the optical axis, a front lens group having negative refractive power, an optical-path-bending element for bending an optical path at substantially 90 degrees, and a rear lens group having positive refractive power. The following conditional expression (1) is satisfied:

$$0.75 < (fw \cdot ft)^{1/2}/(-fn1) < 0.95 \tag{1}$$

where fw denotes a focal length of the zoom lens system in the wide-angle end state, ft denotes a focal length of the zoom lens system in the telephoto end state, and fn1 denotes a focal length of the front lens group in the first lens group.

In order to construct the zoom lens system to have a high zoom ratio, although it is effective to increase the number of lens groups or moving amount of each lens group, the zoom lens system becomes large, and the number of lenses composing the system becomes large. Accordingly, a camera equipped with such a zoom lens becomes large even in a so-called retracted state where the lens is accommodated in the camera, so that the camera becomes large.

Then, in a zoom lens system according to the present embodiment, with disposing the optical-path-bending element in the first lens group as described above, it becomes possible to realize to shorten the length in the depth direction of the zoom lens system, and to narrow the lens barrel and the camera body.

In order to further narrow the lens barrel and the camera body, the optical-path-bending element is necessary to become small. In a zoom lens system according to the present embodiment, since the fifth lens group has negative refractive power, the total focal length of the lenses locating to the object side of the fifth lens group becomes small, so that the effective diameter can be small, and the optical-path-bending element can be compact.

Conditional expression (1) defines a focal length of the front lens group in the first lens group.

When the value is equal to or falls below the lower limit of conditional expression (1), in other words, refractive power of the front lens group becomes small, effective diameter of the maximum angle of light ray incident on the optical-path-bending element in the wide-angle end state cannot be small. Accordingly, in order to bend optical path over entire angle of view, the optical-path-bending element has to become large, so that it becomes impossible to realize compactness. Otherwise, in order to construct the optical-path-bending element to be small, refractive power of the second lens group is made to be large and the total lens length of the zoom lens system has to be shortened, so that astigmatism in the wide-angle end state and longitudinal chromatic aberration in the telephoto end state become worse.

In order to secure the effect of the present invention, it is preferable to set the lower limit of conditional expression (1) to 0.80.

On the other hand, when the value is equal to or exceeds the upper limit of conditional expression (1), in other words, when refractive power of the front lens group becomes large, spherical aberration in the telephoto end state becomes worse.

In order to secure the effect of the present invention, it is preferable to set the upper limit of conditional expression (1) to 0.92.

As described above, with satisfying conditional expression (1), it becomes possible to realize to construct the optical-path-bending element to be compact with excellently correcting various aberrations, so that the zoom lens system can be realized to be compact.

In a zoom lens system according to the present embodiment, the following conditional expression (2) is preferably satisfied:

$$0.3 < f1/ft < 0.6 \quad (2)$$

where f1 denotes a focal length of the first lens group.

In a zoom lens system according to the present embodiment, conditional expression (2) defines a relation between a focal length of the first lens group and that of the zoom lens system in the telephoto end state.

When the ratio is equal to or falls below the lower limit of conditional expression (2), refractive power of the first lens group becomes large, spherical aberration in the telephoto end state and chromatic aberration in all focal lengths range become worse.

In order to secure the effect of the present invention, it is preferable to set the lower limit of conditional expression (2) to 0.35.

On the other hand, when the ratio is equal to or exceeds the upper limit of conditional expression (2), refractive power of the first lens group becomes small. Accordingly, in order to realize a high zoom ratio, the moving amount of each lens group upon zooming is necessary to be sufficiently secured, so that the total lens length of the zoom lens system becomes large. Otherwise, refractive power of the third lens group and the fourth lens group have to be large, astigmatism in the wide-angle end state becomes worse.

As described above, in a zoom lens system according to the present embodiment, with satisfying conditional expression (2), it becomes possible to realize to be compact with securing a high zoom ratio.

In a zoom lens system according to the present embodiment, it is preferable that the first lens group, the third lens group, and the fifth lens group are fixed with respect to the image plane upon zooming from the wide-angle end state to the telephoto end state.

With this configuration, since movable lens groups become two, it becomes possible to simplify the drive system for driving these lens groups. Accordingly, the lens barrel can be compact and electricity can be saved.

In a zoom lens system according to the present embodiment, it is preferable that focusing from an infinity object to a close object is carried out by moving the fourth lens group to the object.

With this configuration, since the number of movable lens groups is only two, it becomes possible to simplify the driving system for driving the lens groups. Accordingly, it becomes possible to make the lens barrel small and to save electricity.

In a zoom lens system according to the present embodiment, the following conditional expression (3) is preferably satisfied:

$$1.0 < \beta T5 < 1.5 \quad (3)$$

where $\beta T5$ denotes an imaging magnification of the fifth lens group upon focusing on an infinity object in the telephoto end state.

Conditional expression (3) defines an imaging magnification of the fifth lens group.

When the value is equal to or falls below the lower limit of conditional expression (3), the focal length of the lens groups disposing to the object side of the fifth lens group becomes larger than the focal length of the zoom lens system. Accordingly, the optical-path-bending element becomes large, so that it becomes impossible to realize to construct the zoom lens system to be compact.

On the other hand, when the value is equal to or exceeds the upper limit of conditional expression (3), various aberrations, in particular, spherical aberration in the telephoto end state becomes large.

In order to secure the effect of the present invention, it is preferable to set the upper limit of conditional expression (3) to 1.4.

As described above, in a zoom lens system according to the present embodiment, with satisfying conditional expression (3), it becomes possible to realize to construct the zoom lens system to be compact with excellently correcting various aberrations such as spherical aberration.

In a zoom lens system according to the present embodiment, the fifth lens group preferably consists of one cemented lens.

With this configuration, it becomes possible to suppress generation of chromatic aberration in the fifth lens group, and to keep the mutual decentering caused by manufacturing error within extremely low level. Moreover, the cemented lens may be constructed by three lenses or more.

In a zoom lens system according to the present embodiment, it is preferable that variation in imaging position caused by a camera shake is corrected by moving the third lens group in a direction substantially perpendicular to the optical axis.

In a vibration reduction method carried out by decentering a portion of the lens system, it is generally required that the amount of decentering is small and deterioration in optical performance upon vibration reduction is also extremely small. In particular, when a zoom lens system is tried to be compact by bending optical path thereof, it is indispensable that the amount of decentering is made to be minimal. Moreover, in the decentered lens group, in other words, the vibration reduction lens group, the diameter has to be small, and chromatic aberration and spherical aberration have to be corrected.

Then, in a zoom lens system according to the present embodiment, since vibration correction is carried out by the third lens group, it becomes possible to excellently correct each aberration with suitably setting decentering sensitivity, so that deterioration in optical performance upon vibration reduction can be small.

A zoom lens system according to the present embodiment includes, in order from an object along an optical axis, a first lens group having positive refractive power, a second lens group having negative refractive power, a third lens group having positive refractive power, a fourth lens group having positive refractive power, and a fifth lens group having negative refractive power. Upon zooming from a wide-angle end state to a telephoto end state, the second lens group and the fourth lens group are moved along the optical axis. The first lens group includes an optical-path-bending element for bending an optical path. Variation in an imaging position caused by a camera shake is corrected by moving the third lens group in a direction substantially perpendicular to the optical axis.

In order to make an optical system compact, it is an effective measure to construct an imaging device used in combination with the optical system to be compact. However, when the imaging device is made to be compact, each light-sensitive element becomes minute, and the light amount received in each light-sensitive element becomes small, so that sensitivity becomes lower. Incidentally, when an imaging device is constructed to have large number of pixels, each pixel becomes minute, and the light amount received in each pixel becomes small, so that light sensitivity becomes lower. Accordingly, in order to compensate decrease in light sensitivity, the optical system has to be a large aperture ratio or the exposure time upon shooting has to be long. However, when the optical system is made to be a large aperture ratio, the optical system naturally becomes large, so that the effect of making the imaging device compact is cancelled out. Accordingly, it is against the object of the invention. On the other hand, when the exposure time is made to be long, since an image blur is liable to happen, a vibration reduction mechanism for correcting an image blur becomes indispensable to the optical system.

In a zoom lens system according to the present embodiment, vibration reduction is carried out by moving the third lens group in a direction substantially perpendicular to the optical axis as described above.

In a vibration reduction method correcting variation in the imaging position caused by a camera shake by decentering a portion of the optical system, it is required that decentered amount is small and deterioration in optical performance is extremely small. In particular, when a zoom lens system is made to be compact by bending optical path thereof, it is indispensable that the decentering amount is small. Moreover, the decentered lens group, in other words, the vibration reduction lens group is required that the diameter thereof is small and chromatic aberration and spherical aberration thereof have to be corrected.

Then, in a zoom lens system according to the present embodiment, with carrying out vibration reduction by the third lens group as described above, it becomes possible to excellently correct each aberration with suitably setting decentering sensitivity, so that deterioration in optical performance upon vibration reduction can be small.

In a zoom lens system according to the present embodiment, the following conditional expression (4) is preferably satisfied:

$$1.0 < (1-\beta 3T) \cdot \beta rT < 1.8 \quad (4)$$

where $\beta 3T$ denotes an imaging magnification of the third lens group upon focusing on an infinity object in the telephoto end state, and $\beta rT$ denotes a combined imaging magnification of lens groups disposing to the image side of the third lens group.

Conditional expression (4) defines a relation between the imaging magnification of the third lens group and combined imaging magnification of lens groups disposed to the image side of the third lens group, and shows decentering sensitivity of the third lens group.

When the value is equal to or falls below the lower limit of conditional expression (4), the decentering amount of the third lens group upon vibration reduction becomes large. Accordingly, the vibration reduction mechanism becomes large, so that it becomes impossible to realize to make the lens barrel thinner. Moreover, when the lens barrel is made to be thinner without changing the condition, it becomes impossible to correct the large image blur. Accordingly, sufficient vibration reduction effect by the vibration reduction mechanism cannot be obtained, and coma becomes worse, so that it becomes impossible to realize excellent optical performance.

In order to secure the effect of the present invention, it is preferable to set the lower limit of conditional expression (4) to 1.05.

On the other hand, when the value is equal to or exceeds the upper limit of conditional expression (4), decentering sensitivity of the third lens group becomes excessively high. Accordingly, variation in the image is generated by a minute error, so that contrast becomes lower.

In order to secure the effect of the present invention, it is preferable to set the upper limit of conditional expression (4) to 1.65. In order to further secure the effect of the present invention, it is most preferable to set the upper limit of conditional expression (4) to 1.50.

As described above, with satisfying conditional expression (4) by a zoom lens system according to the present embodiment, it becomes possible to realize sufficient vibration reduction effect despite of compactness thereof.

In a zoom lens system according to the present embodiment, the following conditional expression (5) is preferably satisfied:

$$-0.2 < 1/\beta 3T < 0.2 \quad (5)$$

where $\beta 3T$ denotes an imaging magnification of the third lens group upon focusing on an infinity object in the telephoto end state.

Conditional expression (5) defines imaging magnification of the third lens group.

When the value is equal to or falls below the lower limit of conditional expression (5), refractive power of the third lens group becomes large, so that it is effective to shorten the total lens length. However, astigmatism caused by decentering between the third lens group and the fourth lens group becomes large, so that deterioration in optical performance upon vibration reduction becomes large.

On the other hand, when the value is equal to or exceeds the upper limit of conditional expression (5), the total lens length becomes large. In order to shorten the total lens length, refractive power of the first lens group and the fourth lens group have to be large, so that it becomes difficult to correct spherical aberration. Moreover, because of decentering between the third lens group and the fourth lens group astigmatism becomes large, so that deterioration in optical performance upon vibration reduction becomes large.

In order to secure the effect of the present invention, it is preferable to set the upper limit of conditional expression (5) to 0.1.

As described above, when a zoom lens system according to the present embodiment satisfies conditional expression (5), it becomes possible to prevent deterioration in optical performance upon decentering between the third lens group and the fourth lens group, and to accomplish high optical performance upon vibration reduction.

In a zoom lens system according to the present embodiment, the first lens group includes, in order from the object along the optical axis, a front lens group having negative refractive power, an optical-path-bending element, and a rear lens group having positive refractive power, and the following conditional expression (1) is preferably satisfied:

$$0.75 < (fw \cdot ft)^{1/2}/(-fn1) < 0.95 \quad (1)$$

where fw denotes a focal length of the zoom lens system in the wide-angle end state, ft denotes a focal length of the zoom lens system in the telephoto end state, and fn1 denotes a focal length of the front lens group in the first lens group.

In a zoom lens system according to the present embodiment, the following conditional expression (2) is preferably satisfied:

$$0.3 < f1/ft < 0.6 \quad (2)$$

where f1 denotes a focal length of the first lens group.

Conditional expressions (1) and (2) have already been explained above, so that duplicated explanations are omitted.

In a zoom lens system according to the present embodiment, the first lens group, the third lens group, and the fifth lens group are preferably fixed with respect to the image plane upon zooming from the wide-angle end state to the telephoto end state.

With this configuration, since the number of movable lens groups becomes only two, the drive system for driving these lens groups can be simple. Accordingly, the lens barrel can be compact, and electricity can be saved.

In a zoom lens system according to the present embodiment, the fourth lens group is preferably moved along the optical axis upon focusing from an infinity object to a close object.

With this lens configuration, the number of movable lens group becomes only two, so that the drive mechanism for driving these lens groups can be simplified. Accordingly, the lens barrel can be compact, and electricity can be saved.

In a zoom lens system according to the present embodiment, the following conditional expression (3) is preferably satisfied:

$$1.0 < \beta T5 < 1.5 \quad (3)$$

where $\beta T5$ denotes an imaging magnification of the fifth lens group upon focusing on an infinity object in the telephoto end state.

Conditional expression (3) has already been explained above, so that duplicated explanations are omitted.

In a zoom lens system according to the present embodiment, the fifth lens group is preferably composed of one cemented lens.

With this configuration, it becomes possible to suppress generation of chromatic aberration in the fifth lens group, and to keep the mutual decentering caused by manufacturing error within extremely low level. Moreover, the cemented lens may be constructed by three lenses or more.

An imaging apparatus according to the present embodiment is equipped with the zoom lens system explained above.

With this configuration, it becomes possible to realize a high optical performance imaging apparatus accomplishing a high zoom ratio and compactness suitable for a highly integrated electronic imaging device.

A method for zooming a zoom lens system according to present embodiment comprising steps of: providing the zoom lens system including, in order from an object along an optical axis, a first lens group having positive refractive power, a second lens group having negative refractive power, a third lens group having positive refractive power, a fourth lens group having positive refractive power, and a fifth lens group having negative refractive power; providing the first lens group including, in order from the object along the optical axis, a front lens group having negative refractive power, an optical-path-bending element for bending an optical path, and a rear lens group having positive refractive power; satisfying the following conditional expression (1):

$$0.75 < (fw \cdot ft)^{1/2}/(-fn1) < 0.95 \quad (1)$$

where fw denotes a focal length of the zoom lens system in the wide-angle end state, ft denotes a focal length of the zoom lens system in the telephoto end state, and fn1 denotes a focal length of the front lens group in the first lens group; and moving the second lens group and the fourth lens group along the optical axis upon zooming from a wide-angle end state to a telephoto end state.

With this configuration, it becomes possible to realize a high optical performance zoom lens system accomplishing a high zoom ratio and compactness suitable for a highly integrated electronic imaging device.

A method for vibration reduction of a zoom lens system according to the present embodiment comprising steps of: providing the zoom lens system including, in order from an object along an optical axis, a first lens group having positive refractive power, a second lens group having negative refractive power, a third lens group having positive refractive power, a fourth lens group having positive refractive power, and a fifth lens group having negative refractive power; moving the second lens group and the fourth lens group along the optical axis upon zooming from a wide-angle end state to a telephoto end state; providing the first lens group including an optical-path-bending element for bending an optical path; and moving the third lens group in a direction substantially perpendicular to the optical axis for correcting variation in the imaging position caused by a camera shake.

With this configuration, it becomes possible to realize a high optical performance zoom lens system accomplishing a high zoom ratio and compactness suitable for a highly integrated electronic imaging device.

A zoom lens system according to each numerical example of the present embodiment is explained with reference to accompanying drawings.

EXAMPLE 1

FIG. 1 is a sectional view showing lens configuration of a zoom lens system according to Example 1 together with a zooming trajectory of each lens group.

The zoom lens system according to Example 1 is composed of, in order from an object along an optical axis, a first lens group G1 having positive refractive power, a second lens group G2 having negative refractive power, a third lens group G3 having positive refractive power, a fourth lens group G4 having positive refractive power, and a fifth lens group G5 having negative refractive power.

The first lens group G1 is composed of, in order from the object along the optical axis, a front lens group G1f having negative refractive power, a rectangular prism P for bending an optical path, and a rear lens group G1r having positive refractive power.

The front lens group G1f is composed of a negative meniscus lens L11 having a concave surface facing an image. The rear lens group G1r is composed of, in order from the object along the optical axis, a double convex positive lens L12, and a double convex positive lens L13 having an aspherical surface facing the object.

Figure 11:
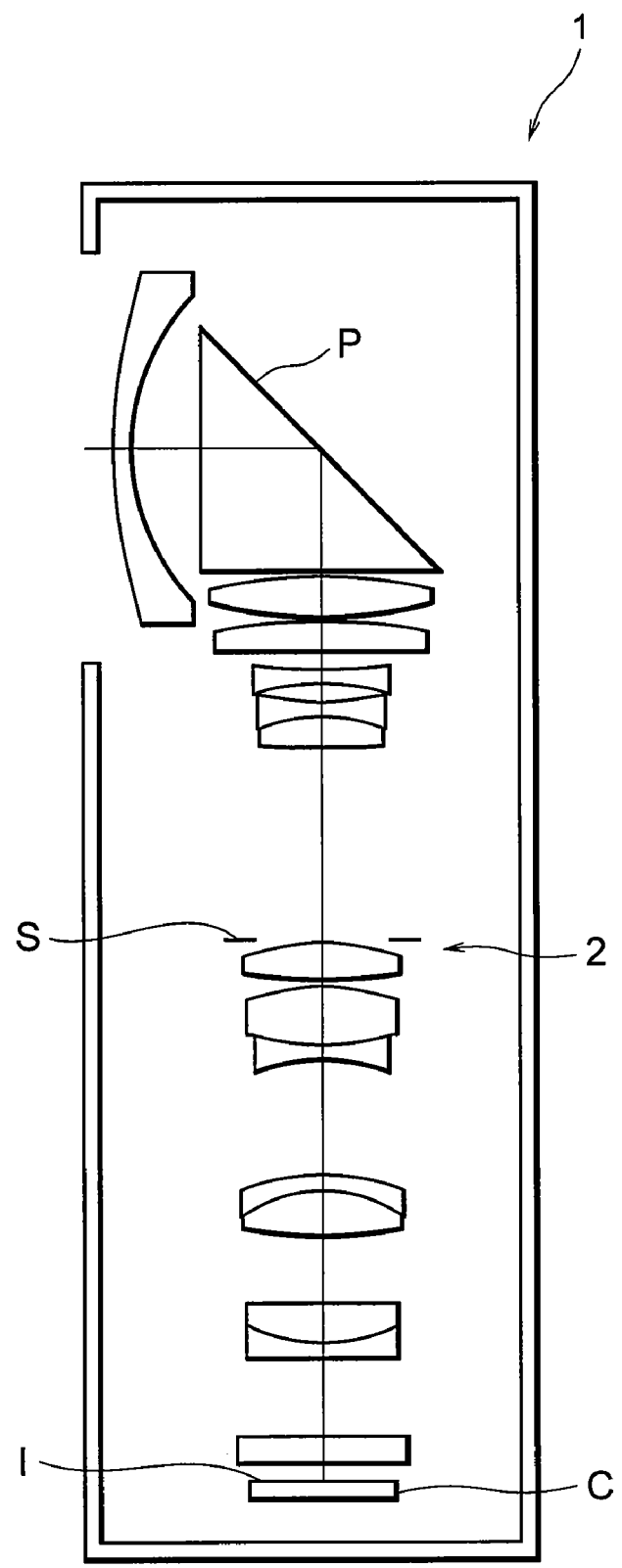
FIG. 11 is a sectional view along A-A line in FIG. 10A.

Although the zoom lens system according to Example 1 has a lens configuration whose optical path is bent by the rectangular prism P at substantially 90 degrees as shown in FIG. 11, the optical path is extended in FIG. 1.

The second lens group G2 is composed of, in order from the object along the optical axis, a double concave negative lens L21 having an aspherical surface facing the image, and a cemented lens constructed by a double concave negative lens L22 cemented with a double convex positive lens L23.

The third lens group G3 is composed of, in order from the object along the optical axis, a double convex positive lens L31 having an aspherical surface facing the image, and a cemented lens constructed by a double convex positive lens L32 cemented with a double concave negative lens L33.

The fourth lens group G4 is composed of a cemented lens constructed by, in order from the object along the optical axis, a negative meniscus lens L41 having a concave surface facing the image cemented with a double convex positive lens L42 having an aspherical surface facing the image.

The fifth lens group G5 is composed of a cemented lens constructed by, in order from the object along the optical axis, a double convex positive lens L51 cemented with a double concave negative lens L52.

An aperture stop S is disposed to the object side of the third lens group G3, and a low-pass filter FL for blocking spatial frequency higher than resolution limit of an imaging device (not shown) is disposed between the fifth lens group G5 and the image plane I.

In the zoom lens system according to Example 1 with this configuration, upon zooming from a wide-angle end state to a telephoto end state, the second lens group G2 is moved to the image, the fourth lens group is moved at first to the object and then to the image, the first lens group G1, the third lens group G3 and the fifth lens group G5 are fixed with respect to the image plane I such that a distance between the first lens group G1 and the second lens group G2 increases, a distance between the second lens group G2 and the third lens group G3 decreases, and a distance between the third lens group G3 and the fourth lens group G4 varies.

In the zoom lens system according to Example 1, variation in the imaging position caused by a camera shake is corrected by moving the third lens group G3 in a direction substantially perpendicular to the optical axis.

Various values associated with a zoom lens system according to Example 1 are listed in Table 1.

In [Specifications], W denotes the wide-angle end state, M denotes an intermediate focal length state, T denotes the telephoto end state, f denotes a focal length, FNO denotes an f-number, and ω denotes a half angle of view (maximum angle of incidence, unit: degree).

In [Lens Data], the first column "N" shows the lens surface number counted in order from the object side, the second column "R" shows a radius of curvature of the lens surface, the third column "D" shows a distance to the next surface, the fourth column "nd" shows a refractive index at d-line (wavelength λ=587.6 nm), and the fifth column "vd" shows an Abbe number at d-line (wavelength λ=587.6 nm). Moreover, a radius of curvature R=∞ denotes a plane surface. Refractive index of the air nd=1.000000 is omitted.

In [Aspherical Data], aspherical coefficients upon exhibiting an aspherical surface by the following expression are shown:

$$x = cy^2/[1+[1-\kappa c^2 y^2]^{1/2}] + C4 x y^4 + C6 x y^6 + \ldots$$

where y denotes a vertical height from the optical axis, x denotes a sag amount which is a distance along the optical axis from the tangent surface at the vertex of the aspherical surface to the aspherical surface at the vertical height y from the optical axis, c denotes a curvature of a reference sphere (paraxial curvature), κ denotes a conical coefficient, C4, C6, . . . denote aspherical coefficients. "E-n" denotes "$\times 10^{-n}$", for example, "1.234E−0.05" denotes "$1.234 \times 10^{-5}$".

In [Variable Distances], a focal length f, and respective distances are shown.

In the tables for various values, "mm" is generally used for the unit of length such as the focal length, the radius of curvature and the like. However, since similar optical performance can be obtained by an optical system proportionally enlarged or reduced its dimension, the unit is not necessarily to be limited to "mm", and any other suitable unit can be used. The explanation of reference symbols is the same in the other Examples.

TABLE 1

[Specifications]

|  | W | M | T |
|---|---|---|---|
| f = | 6.50 | 15.00 | 30.60 |
| FNO = | 3.74 | 4.15 | 5.04 |
| ω = | 31.7 | 13.7 | 6.7 |

[Lens Data]

| N | R | D | nd | vd |
|---|---|---|---|---|
| 1 | 50.0000 | 1.0000 | 1.846660 | 23.78 |
| 2 | 10.9000 | 2.1000 | | |
| 3 | ∞ | 10.5000 | 1.804000 | 46.57 |
| 4 | ∞ | 0.2000 | | |
| 5 | 18.9550 | 2.6000 | 1.497820 | 82.56 |
| 6 | −16.8287 | 0.1000 | | |
| 7 | 24.7775 | 1.8000 | 1.743300 | 49.32 |
| 8 | −616.4597 | D8 | | |
| 9 | −20.9803 | 0.9000 | 1.820800 | 42.71 |
| 10 | 8.7929 | 1.0000 | | |
| 11 | −10.4372 | 0.9000 | 1.816000 | 46.62 |
| 12 | 7.3865 | 1.8000 | 1.846660 | 23.78 |
| 13 | −27.8034 | D13 | | |
| 14 | ∞ | 0.2000 | | Aperture Stop S |
| 15 | 10.5499 | 2.2000 | 1.589129 | 61.25 |
| 16 | −18.3608 | 0.3000 | | |
| 17 | 8.7286 | 3.4000 | 1.497820 | 82.56 |
| 18 | −9.0124 | 0.9000 | 1.785896 | 44.20 |
| 19 | 8.5239 | D19 | | |
| 20 | 9.3388 | 0.9000 | 1.785896 | 44.20 |
| 21 | 5.7878 | 2.6000 | 1.497820 | 82.56 |
| 22 | −16.8053 | D22 | | |
| 23 | 72.2380 | 2.3000 | 1.516330 | 64.14 |
| 24 | −7.1765 | 0.9000 | 1.755199 | 27.51 |
| 25 | 227.3969 | 4.3900 | | |
| 26 | ∞ | 1.6500 | 1.544370 | 70.51 |
| 27 | ∞ | | | |

[Aspherical Data]

Surface Number: 7

κ = −7.6507
C4 = 4.88800E−05
C6 = −5.48520E−07
C8 = 0.00000E+00
C10 = 0.00000E+00

Surface Number: 10

κ = 6.8403
C4 = −1.37810E−03
C6 = −7.98430E−06
C8 = −9.52370E−06
C10 = 0.00000E+00

Surface Number: 16

κ = −11.6168
C4 = −1.39880E−04
C6 = 1.77700E−06
C8 = 0.00000E+00
C10 = 0.00000E+00

Surface Number: 22

κ = −10.1342
C4 = −1.71540E−04
C6 = −6.06960E−07
C8 = 0.00000E+00
C10 = 0.00000E+00

TABLE 1-continued

[Variable Distances]

|  | W | M | T |
|---|---|---|---|
| f = | 6.5000 | 15.0000 | 30.6000 |
| D8 = | 1.0357 | 6.6328 | 10.9658 |
| D13 = | 11.4002 | 5.8030 | 1.4700 |
| D19 = | 6.6537 | 2.6818 | 4.2525 |
| D22 = | 3.8073 | 7.7792 | 6.2085 |

[Values for Conditional Expressions]

Figure 3A:
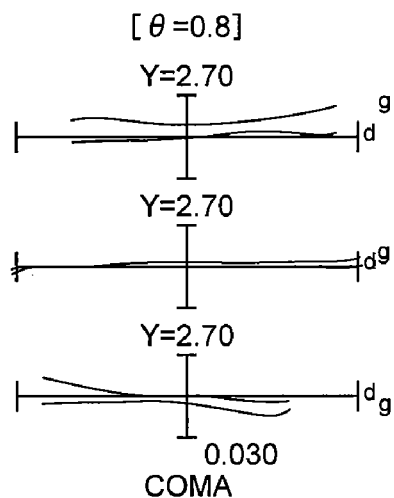

(1): $(fw \cdot ft)^{1/2}/(-fn1) = 0.85$
(2): $f1/ft = 0.46$
(3): $\beta T5 = 1.19$
(4): $(1 - \beta 3T) \cdot \beta rT = 1.30$
(5): $1/\beta 3T = -0.03$ FIGS. 2A and 3A are graphs showing aberration of the zoom lens system according to Example 1 upon focusing on an infinity object in the wide-angle end state (f=6.50), in which FIG. 2A shows various aberrations without vibration reduction, and FIG. 3A shows coma upon vibration reduction (θ=0.8).

Figure 2B:
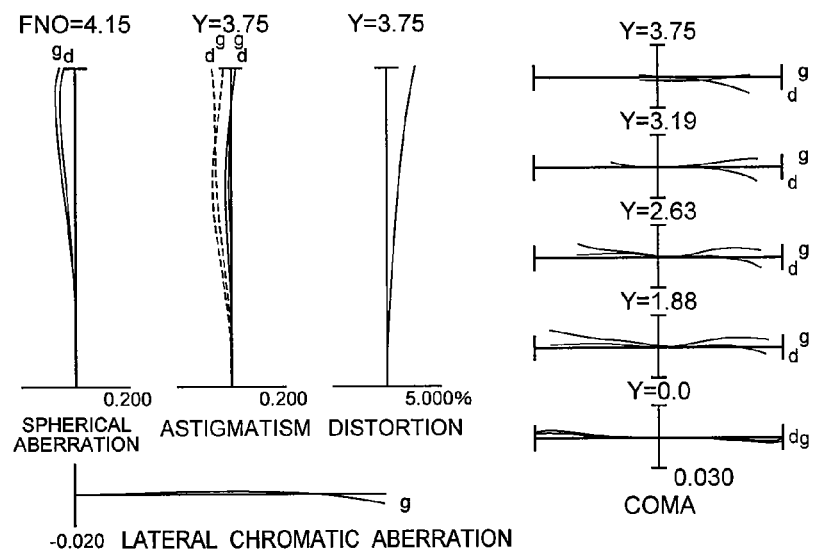
Figure 3B:
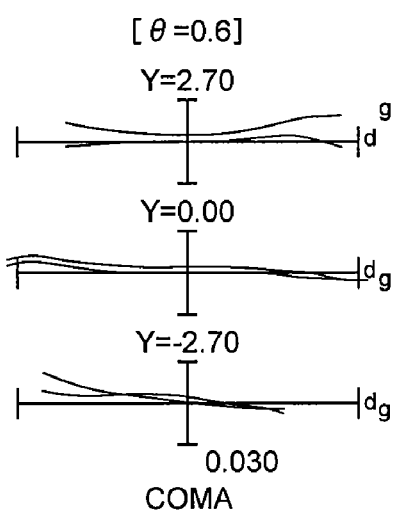

FIGS. 2B and 3B are graphs showing aberration of the zoom lens system according to Example 1 upon focusing on an infinity object in an intermediate focal length state (f=15.0), in which FIG. 2B shows various aberrations without vibration reduction, and FIG. 3B shows coma upon vibration reduction (θ=0.6).

Figure 2C:
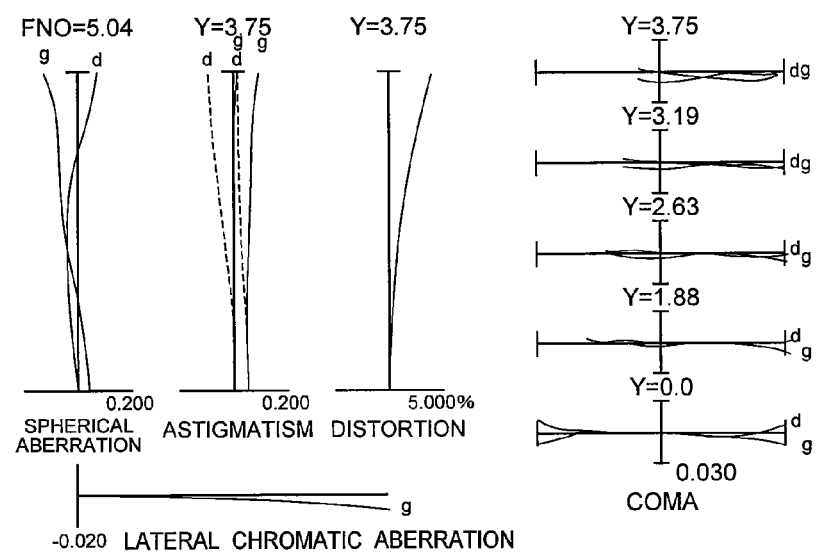
Figure 3C:
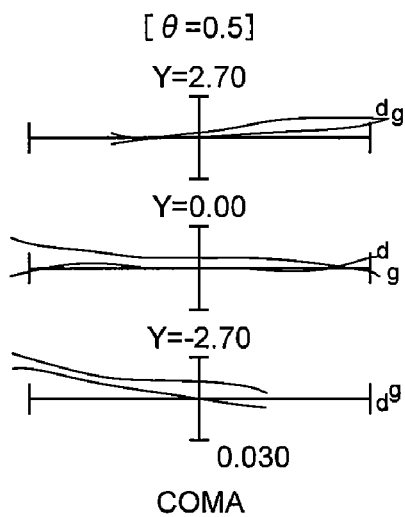

FIGS. 2C and 3C are graphs showing aberration of the zoom lens system according to Example 1 upon focusing on an infinity object in the telephoto end state (f=30.6), in which FIG. 2C shows various aberrations without vibration reduction, and FIG. 3C shows coma upon vibration reduction (θ=0.5).

In respective graphs, FNO denotes an f-number, and Y denotes an image height. In graphs showing spherical aberration, an f-number with respect to the maximum aperture is shown. In graphs showing coma, coma with respect to each image height is shown. In respective graphs, d denotes an aberration curve at d-line (wavelength λ=587.6 nm), and g denotes an aberration curve at g-line (wavelength λ=435.8 nm). In graphs showing astigmatism, a solid line indicates a sagittal image plane, and a broken line indicates a meridional image plane. Moreover, θ denotes a correction angle in degrees upon vibration reduction.

The above-described explanation regarding various aberration graphs is the same as the other Examples.

As is apparent from the respective graphs, the zoom lens system according to Example 1 shows superb optical performance as a result of good corrections to various aberrations in the wide-angle end state, in the intermediate focal length state, and in the telephoto end state.

EXAMPLE 2

Figure 4:
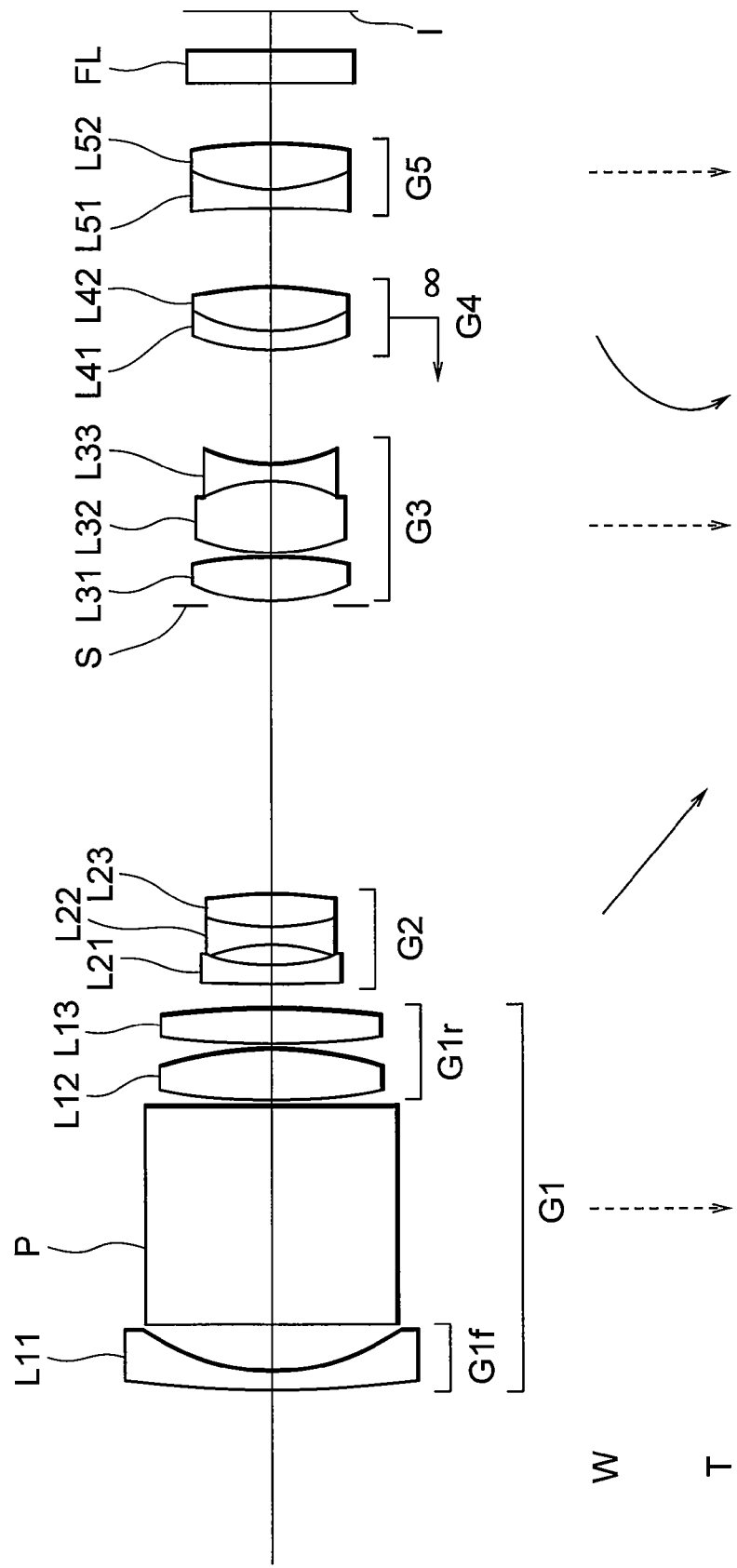
FIG. 4 is a sectional view showing lens configuration of a zoom lens system according to Example 2 together with a zooming trajectory of each lens group.

FIG. 4 is a sectional view showing lens configuration of a zoom lens system according to Example 2 together with a zooming trajectory of each lens group.

The zoom lens system according to Example 2 is composed of, in order from an object along an optical axis, a first lens group G1 having positive refractive power, a second lens group G2 having negative refractive power, a third lens group G3 having positive refractive power, a fourth lens group G4 having positive refractive power, and a fifth lens group G5 having negative refractive power.

The first lens group G1 is composed of, in order from the object along the optical axis, a front lens group G1f having negative refractive power, a rectangular prism P for bending an optical path, and a rear lens group G1r having positive refractive power.

The front lens group G1f is composed of a negative meniscus lens L11 having a concave surface facing an image. The rear lens group G1r is composed of, in order from the object along the optical axis, a double convex positive lens L12, and a double convex positive lens L13 having aspherical surfaces on both lens surfaces.

Although the zoom lens system according to Example 2 has a lens configuration whose optical path is bent by the rectangular prism P at substantially 90 degrees as shown in FIG. 11, the optical path is extended in FIG. 4.

The second lens group G2 is composed of, in order from the object along the optical axis, a negative meniscus lens L21 having a concave surface facing the image, and a cemented lens constructed by a double concave negative lens L22 cemented with a double convex positive lens L23.

The third lens group G3 is composed of, in order from the object along the optical axis, a double convex positive lens L31 having an aspherical surface facing the image, and a cemented lens constructed by a double convex positive lens L32 cemented with a double concave negative lens L33.

The fourth lens group G4 is composed of a cemented lens constructed by, in order from the object along the optical axis, a negative meniscus lens L41 having a concave surface facing the image cemented with a double convex positive lens L42 having an aspherical surface facing the image.

The fifth lens group G5 is composed of a cemented lens constructed by, in order from the object along the optical axis, a double concave negative lens L51 cemented with a double convex positive lens L52.

An aperture stop S is disposed to the object side of the third lens group G3, and a low-pass filter FL for blocking spatial frequency higher than resolution limit of an imaging device (not shown) is disposed between the fifth lens group G5 and the image plane I.

In the zoom lens system according to Example 2 with this configuration, upon zooming from a wide-angle end state to a telephoto end state, the second lens group G2 is moved to the image, the fourth lens group is moved at first to the object and then to the image, and the first lens group G1, the third lens group G3 and the fifth lens group G5 are fixed with respect to the image plane I such that a distance between the first lens group G1 and the second lens group G2 increases, a distance between the second lens group G2 and the third lens group G3 decreases, and a distance between the third lens group G3 and the fourth lens group G4 varies.

In the zoom lens system according to Example 2, variation in the imaging position caused by a camera shake is corrected by moving the third lens group G3 in a direction substantially perpendicular to the optical axis.

Various values associated with a zoom lens system according to Example 2 are listed in Table 2.

TABLE 2

[Specifications]

|  | W | M | T |
|---|---|---|---|
| f = | 6.50 | 15.00 | 30.40 |
| FNO = | 3.79 | 4.15 | 5.04 |
| ω = | 31.5 | 13.6 | 6.7 |

TABLE 2-continued

[Lens Data]

| N | R | D | nd | vd |
|---|---|---|---|---|
| 1 | 58.7063 | 1.0000 | 1.846660 | 23.78 |
| 2 | 10.9555 | 2.2000 | | |
| 3 | ∞ | 10.5000 | 1.804000 | 46.57 |
| 4 | ∞ | 0.2000 | | |
| 5 | 30.0095 | 2.6000 | 1.497820 | 82.56 |
| 6 | −17.9811 | 0.1000 | | |
| 7 | 32.6887 | 1.8000 | 1.743300 | 49.32 |
| 8 | −61.7001 | D8 | | |
| 9 | 65.6074 | 0.9000 | 1.754999 | 52.32 |
| 10 | 8.6545 | 1.0000 | | |
| 11 | −8.5010 | 0.9000 | 1.816000 | 46.62 |
| 12 | 10.1254 | 1.6046 | 1.846660 | 23.78 |
| 13 | −30.5218 | D13 | | |
| 14 | ∞ | 0.2000 | | Aperture Stop S |
| 15 | 8.7161 | 2.2000 | 1.589130 | 61.24 |
| 16 | −24.0449 | 0.1000 | | |
| 17 | 8.5006 | 3.5000 | 1.497820 | 82.56 |
| 18 | −7.2314 | 0.9000 | 1.785896 | 44.20 |
| 19 | 7.2248 | D19 | | |
| 20 | 10.4319 | 0.9000 | 1.785896 | 44.20 |
| 21 | 7.6858 | 2.2000 | 1.497820 | 82.56 |
| 22 | −14.3042 | D22 | | |
| 23 | −38.9384 | 0.9000 | 1.755199 | 27.51 |
| 24 | 8.2117 | 2.3000 | 1.516330 | 64.14 |
| 25 | −25.0350 | 2.8600 | | |
| 26 | ∞ | 1.6500 | 1.544370 | 70.51 |
| 27 | ∞ | | | |

[Aspherical Data]

Surface Number: 7

$\kappa = 6.2256$
$C4 = -1.25520E-04$
$C6 = 0.00000E+00$
$C8 = 0.00000E+00$
$C10 = -3.30180E-10$ Surface Number: 8

$\kappa = 5.0851$
$C4 = -1.23980E-04$
$C6 = 9.31640E-07$
$C8 = -2.28530E-08$
$C10 = 0.00000E+00$ Surface Number: 16

$\kappa = -22.1815$
$C4 = -1.04460E-04$
$C6 = 0.00000E+00$
$C8 = 0.00000E+00$
$C10 = 0.00000E+00$ Surface Number: 22

$\kappa = 12.2318$
$C4 = 7.50160E-04$
$C6 = 3.76350E-05$
$C8 = -2.50090E-06$
$C10 = 2.04040E-07$

[Variable Distances]

| | W | M | T |
|---|---|---|---|
| f = | 6.5000 | 15.0000 | 30.4000 |
| D8 = | 1.1077 | 8.1330 | 13.5434 |
| D13 = | 13.9645 | 6.9393 | 1.5289 |
| D19 = | 5.4092 | 2.3834 | 4.2622 |
| D22 = | 3.7129 | 6.7387 | 4.8599 |

TABLE 2-continued

[Values for Conditional Expressions]

Figure 5A:
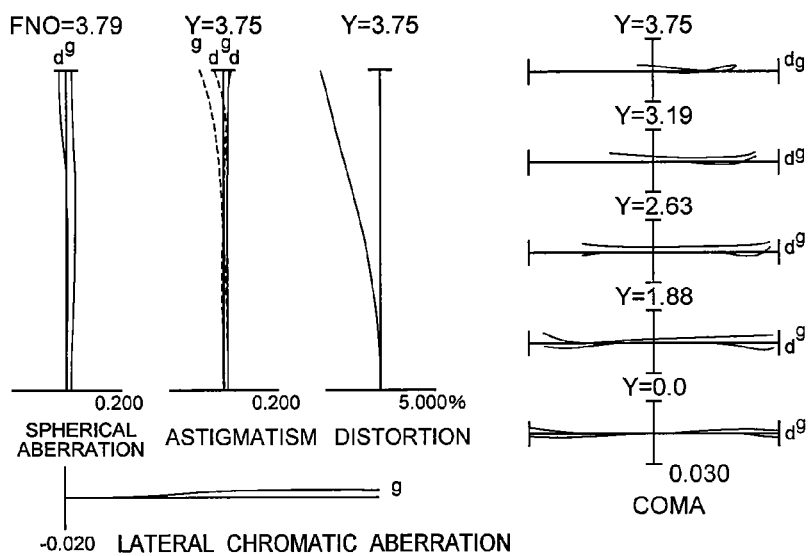
Figure 6A:
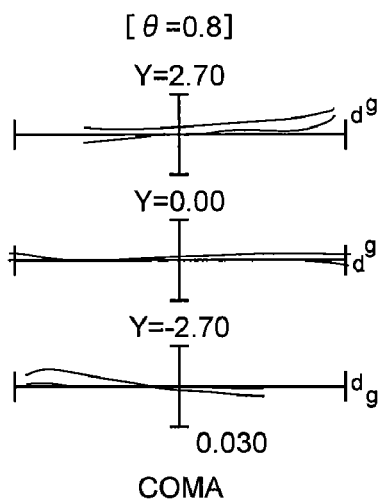

(1): $(fw \cdot ft)^{1/2}/(-fn1) = 0.88$
(2): $f1/ft = 0.55$
(3): $\beta T5 = 1.24$
(4): $(1 - \beta 3T) \cdot \beta rT = 1.12$
(5): $1/\beta 3T = -0.16$ FIGS. 5A and 6A are graphs showing aberration of the zoom lens system according to Example 2 upon focusing on an infinity object in the wide-angle end state (f=6.50), in which FIG. 5A shows various aberrations without vibration reduction, and FIG. 6A shows coma upon vibration reduction (θ=0.8).

Figure 5B:
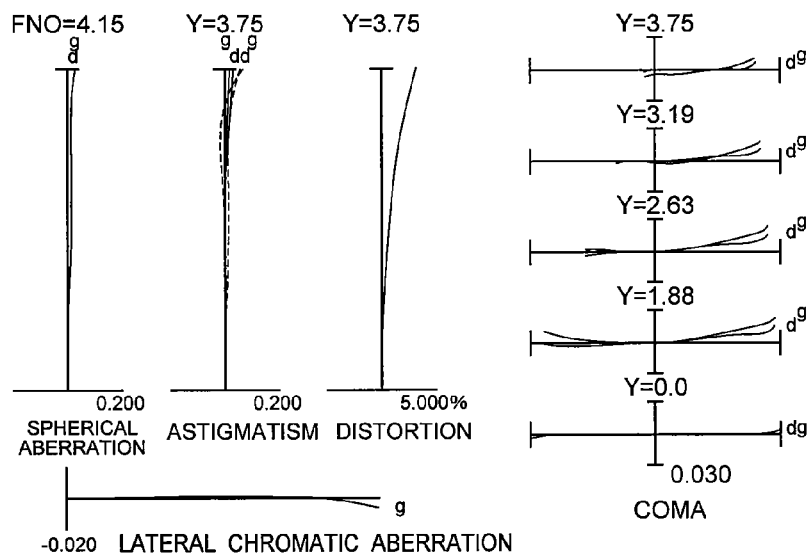
Figure 6B:
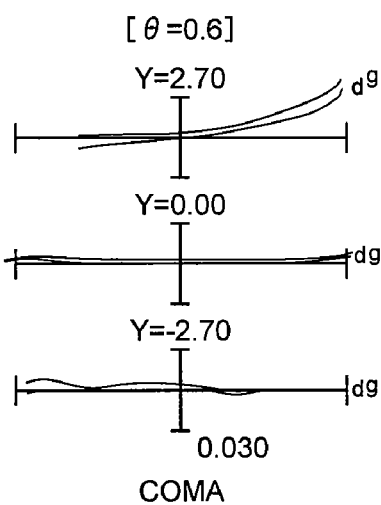

FIGS. 5B and 6B are graphs showing aberration of the zoom lens system according to Example 2 upon focusing on an infinity object in an intermediate focal length state (f=15.0), in which FIG. 5B shows various aberrations without vibration reduction, and FIG. 6B shows coma upon vibration reduction (θ=0.6).

Figure 5C:
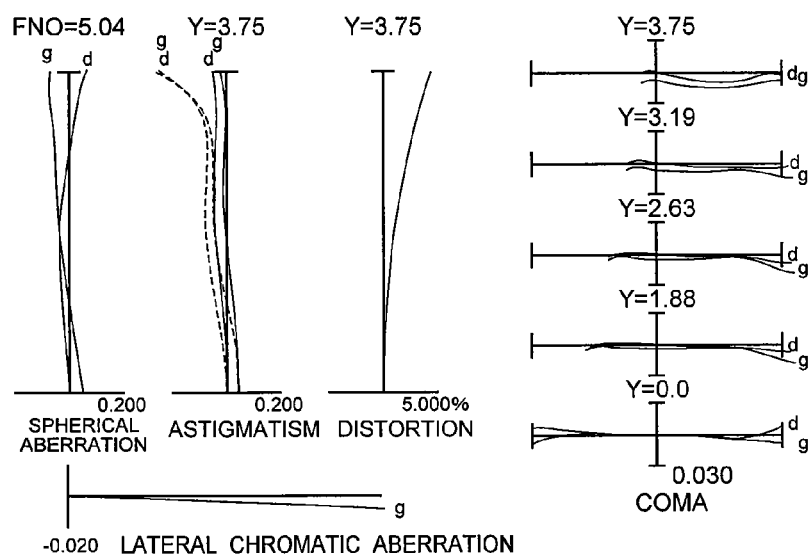
Figure 6C:
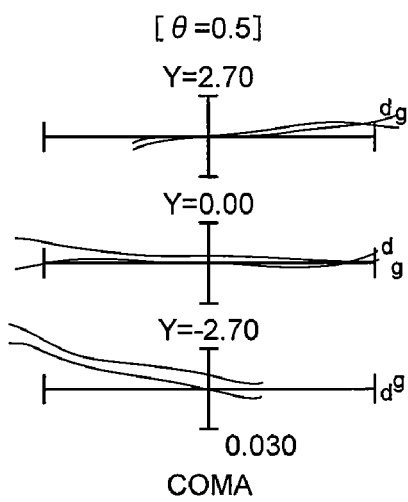

FIGS. 5C and 6C are graphs showing aberration of the zoom lens system according to Example 2 upon focusing on an infinity object in the telephoto end state (f=30.4), in which FIG. 5C shows various aberrations without vibration reduction, and FIG. 6C shows coma upon vibration reduction (θ=0.5).

As is apparent from the respective graphs, the zoom lens system according to Example 2 shows superb optical performance as a result of good corrections to various aberrations in the wide-angle end state, in the intermediate focal length state, and in the telephoto end state.

EXAMPLE 3

FIG. 7 is a sectional view showing lens configuration of a zoom lens system according to Example 3 together with a zooming trajectory of each lens group.

The zoom lens system according to Example 3 is composed of, in order from an object along an optical axis, a first lens group G1 having positive refractive power, a second lens group G2 having negative refractive power, a third lens group G3 having positive refractive power, a fourth lens group G4 having positive refractive power, and a fifth lens group G5 having negative refractive power.

The first lens group G1 is composed of, in order from the object along the optical axis, a front lens group G1f having negative refractive power, a rectangular prism P for bending an optical path, and a rear lens group G1r having positive refractive power.

The front lens group G1f is composed of a negative meniscus lens L11 having a concave surface facing an image. The rear lens group G1r is composed of, in order from the object along the optical axis, a double convex positive lens L12 having an aspherical surface facing the image, and a double convex positive lens L13.

Although the zoom lens system according to Example 3 has a lens configuration whose optical path is bent by the rectangular prism P at substantially 90 degrees as shown in FIG. 11, the optical path is extended in FIG. 7.

The second lens group G2 is composed of, in order from the object along the optical axis, a double concave negative lens L21 having an aspherical surface facing the image, and a cemented lens constructed by a double concave negative lens L22 cemented with a double convex positive lens L23.

The third lens group G3 is composed of, in order from the object along the optical axis, a double convex positive lens L31 having an aspherical surface facing the image, and a cemented lens constructed by a double convex positive lens L32 cemented with a double concave negative lens L33.

The fourth lens group G4 is composed of a cemented lens constructed by, in order from the object along the optical axis, a negative meniscus lens L41 having a concave surface facing the image cemented with a double convex positive lens L42 having an aspherical surface facing the image.

The fifth lens group G5 is composed of a cemented lens constructed by, in order from the object along the optical axis, a positive meniscus lens L51 having a convex surface facing the image cemented with a negative meniscus lens L52 having a concave surface facing the object.

An aperture stop S is disposed to the object side of the third lens group G3, and a low-pass filter FL for blocking spatial frequency higher than resolution limit of an imaging device (not shown) is disposed between the fifth lens group G5 and the image plane I.

In the zoom lens system according to Example 3 with this configuration, upon zooming from a wide-angle end state to a telephoto end state, the second lens group G2 is moved to the image, the fourth lens group is moved at first to the object and then to the image, and the first lens group G1, the third lens group G3 and the fifth lens group G5 are fixed with respect to the image plane I such that a distance between the first lens group G1 and the second lens group G2 increases, a distance between the second lens group G2 and the third lens group G3 decreases, and a distance between the third lens group G3 and the fourth lens group G4 varies.

In the zoom lens system according to Example 3, variation in the imaging position caused by a camera shake is corrected by moving the third lens group G3 in a direction substantially perpendicular to the optical axis.

Various values associated with a zoom lens system according to Example 3 are listed in Table 3.

TABLE 3

[Specifications]

|   | W | M | T |
|---|---|---|---|
| f = | 6.50 | 15.00 | 30.60 |
| FNO = | 3.65 | 4.67 | 5.65 |
| ω = | 31.5 | 13.6 | 6.7 |

[Lens Data]

| N | R | D | nd | vd |
|---|---|---|---|---|
| 1 | 50.0000 | 1.0000 | 1.846660 | 23.78 |
| 2 | 10.6981 | 2.1000 | | |
| 3 | ∞ | 10.5000 | 1.804000 | 46.57 |
| 4 | ∞ | 0.2000 | | |
| 5 | 63.4799 | 1.8000 | 1.816000 | 46.62 |
| 6 | −45.5382 | 0.1000 | | |
| 7 | 20.0360 | 2.6000 | 1.497820 | 82.52 |
| 8 | −16.4521 | D8 | | |
| 9 | −22.2518 | 0.9000 | 1.816000 | 46.62 |
| 10 | 9.0739 | 1.0000 | | |
| 11 | −10.4412 | 0.9000 | 1.816000 | 46.62 |
| 12 | 9.3760 | 1.8000 | 1.846660 | 23.78 |
| 13 | −25.5289 | D13 | | |
| 14 | ∞ | 0.2000 | | Aperture Stop S |
| 15 | 8.4490 | 2.2000 | 1.589129 | 61.25 |
| 16 | −20.8665 | 0.1000 | | |
| 17 | 8.1025 | 3.4000 | 1.497820 | 82.52 |
| 18 | −6.4970 | 0.9000 | 1.743997 | 44.79 |
| 19 | 6.6331 | D19 | | |
| 20 | 10.6344 | 0.9000 | 1.720467 | 34.71 |
| 21 | 7.1416 | 2.6000 | 1.497820 | 82.52 |
| 22 | −19.2110 | D22 | | |
| 23 | −69.2138 | 3.5000 | 1.516330 | 64.14 |
| 24 | −6.0271 | 0.9000 | 1.755199 | 27.51 |
| 25 | −23.9599 | 3.3195 | | |
| 26 | ∞ | 1.6500 | 1.544370 | 70.51 |
| 27 | ∞ | | | |

[Aspherical Data]

Surface Number: 6

κ = 1.0329
C4 = 3.47900E−05
C6 = 2.25660E−07
C8 = −2.12820E−09
C10 = 6.31030E−11

Surface Number: 10

κ = 2.5562
C4 = −4.97900E−04
C6 = 6.38510E−06
C8 = −1.59650E−06
C10 = 6.44070E−08

Surface Number: 16

κ = −0.8998
C4 = 1.08270E−04
C6 = −1.42490E−06
C8 = −1.47810E−07
C10 = 4.36000E−09

Surface Number: 22

κ = 1.0000
C4 = 1.12160E−04
C6 = 3.82280E−06
C8 = −4.48830E−07
C10 = 1.40980E−08

[Variable Distances]

|   | W | M | T |
|---|---|---|---|
| f = | 6.5000 | 15.0000 | 30.6000 |
| D8 = | 1.1945 | 6.9917 | 11.4976 |
| D13 = | 11.4032 | 5.6059 | 1.1001 |
| D19 = | 6.9585 | 2.1658 | 2.7858 |
| D22 = | 3.2125 | 8.0052 | 7.3851 |

[Values for Conditional Expressions]

Figure 8A:
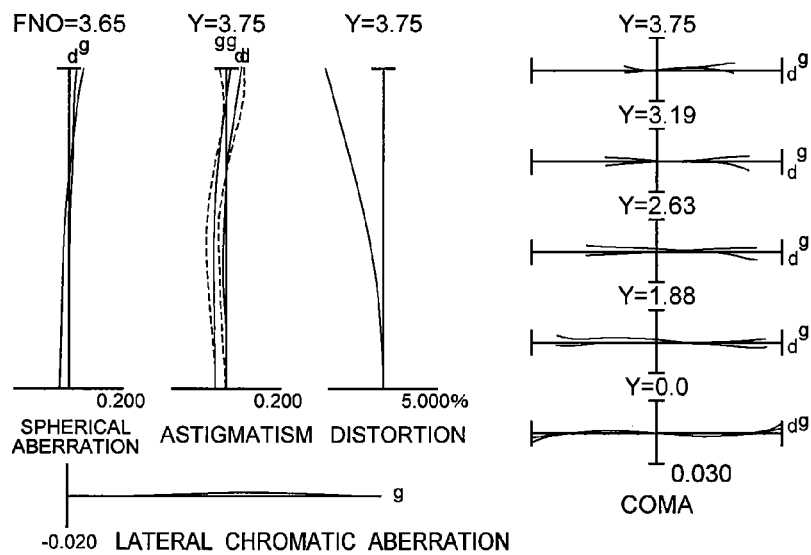
Figure 9A:
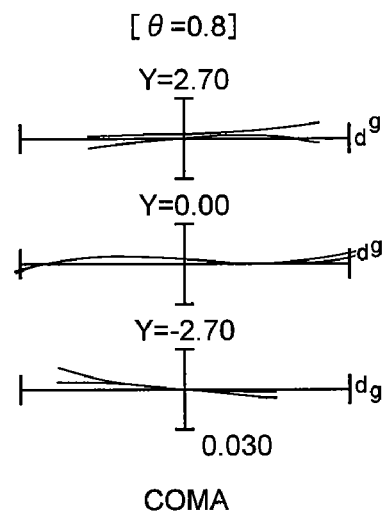

(1): $(fw \cdot ft)^{1/2}/(-fn1) = 0.87$
(2): $f1/ft = 0.48$
(3): $\beta T5 = 1.12$
(4): $(1 - \beta 3T) \cdot \beta rT = 1.38$
(5): $1/\beta 3T = 0.00$ FIGS. 8A and 9A are graphs showing aberration of the zoom lens system according to Example 3 upon focusing on an infinity object in the wide-angle end state (f=6.50), in which FIG. 8A shows various aberrations without vibration reduction, and FIG. 9A shows coma upon vibration reduction (θ=0.8).

Figure 8B:
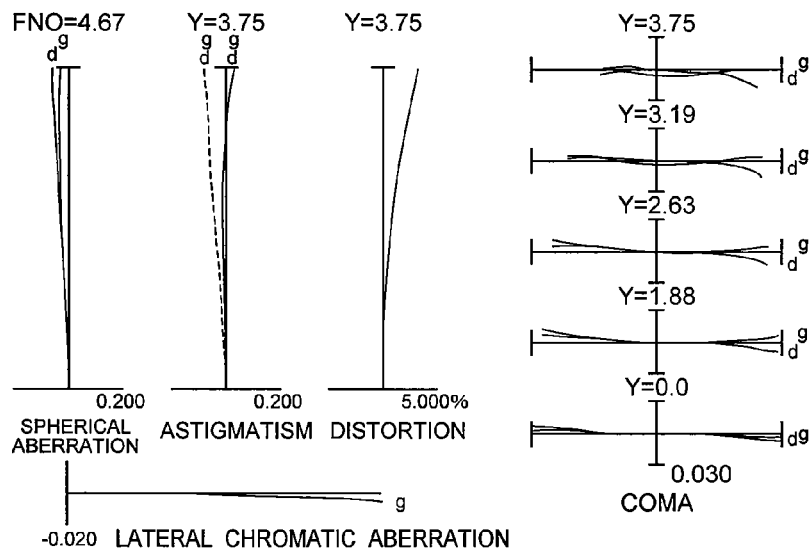
Figure 9B:
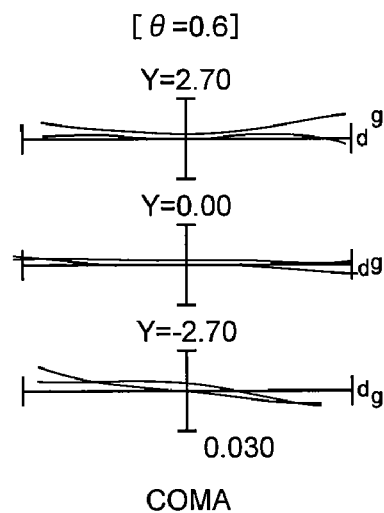

FIGS. 8B and 9B are graphs showing aberration of the zoom lens system according to Example 3 upon focusing on an infinity object in an intermediate focal length state (f=15.0), in which FIG. 8B shows various aberrations without vibration reduction, and FIG. 9B shows coma upon vibration reduction (θ=0.6).

Figure 8C:
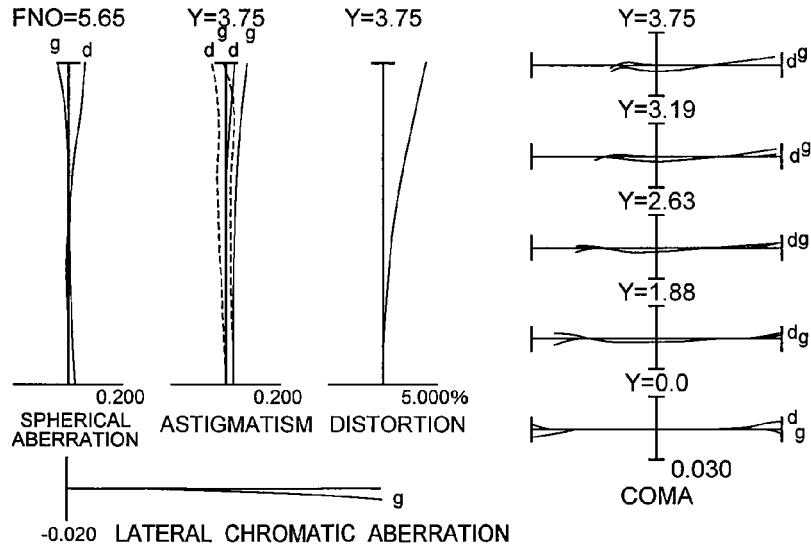
Figure 9C:
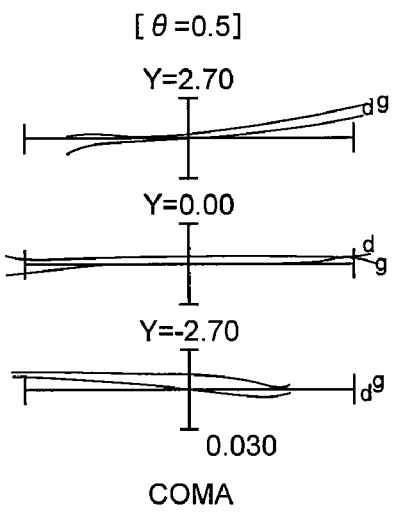

FIGS. 8C and 9C are graphs showing aberration of the zoom lens system according to Example 3 upon focusing on an infinity object in the telephoto end state (f=30.6), in which FIG. 8C shows various aberrations without vibration reduction, and FIG. 9C shows coma upon vibration reduction (θ=0.5).

As is apparent from the respective graphs, the zoom lens system according to Example 3 shows superb optical performance as a result of good corrections to various aberrations in the wide-angle end state, in the intermediate focal length state, and in the telephoto end state.

As described above, each Example of the present embodiment makes it possible to realize a high optical performance zoom lens system with a high zoom ratio and compactness suitable for a highly integrated electronic imaging device.

Although a zoom lens system with a five-lens-group configuration is shown as each Example of the present application, the present application is not limited to this, and is applicable to the other lens configurations such as a six-lens-group configuration, and a seven-lens-group configuration.

In a zoom lens system according to the present embodiment, in order to focusing from an infinity object to a close object, a portion of a lens group, a lens group, or a plurality of lens groups may be moved along an optical axis as a focusing lens group. The focusing lens group may be used for auto focus, and is suitable for being driven by a motor such as an ultrasonic motor. In particular in the optical system according to the present application, it is preferable that the second lens group or the fourth lens group is used as a focusing lens group.

Moreover, in a zoom lens system according to the present embodiment, any lens surface may be an aspherical surface. The aspherical surface may be fabricated by a fine grinding process, a glass molding process that a glass material is formed into an aspherical shape by a mold, or a compound type process that a resin material is formed into an aspherical shape on a glass surface.

An antireflection coating having high transmittance over a broad wavelength range may be applied to each lens surface of a zoom lens system according to the present application to reduce flare or ghost images, so that high optical performance with a high contrast can be attained.

The present embodiment only shows a specific example for the purpose of better understanding of the present invention. Accordingly, it is needless to say that the invention in its broader aspect is not limited to the specific details and representative devices.

Then, a camera equipped with the zoom lens system according to the present embodiment is explained.

Figure 10A:
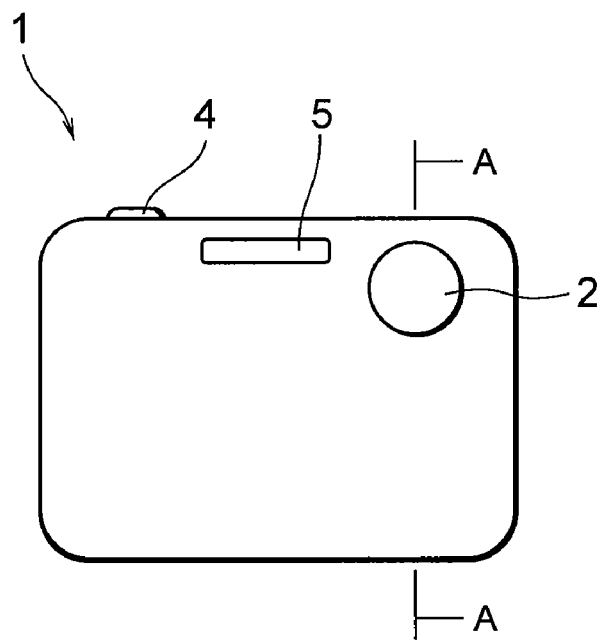
Figure 10B:
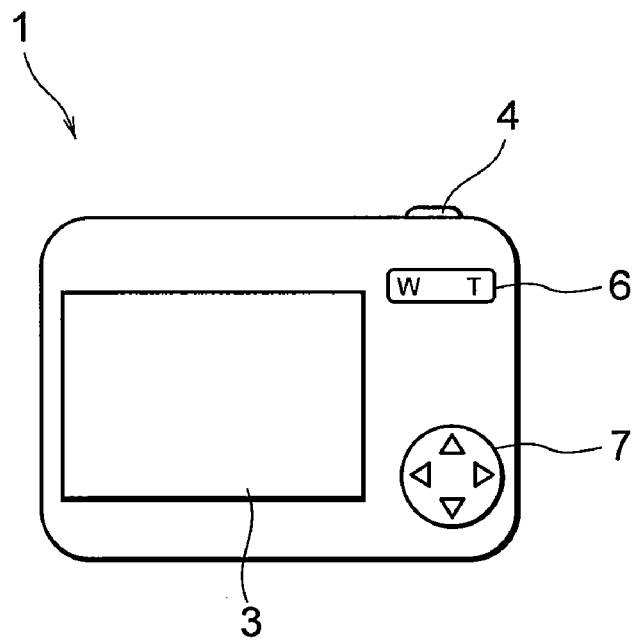

FIGS. 10A and 10B are diagrams showing an electronic still camera equipped with the zoom lens system according to the present embodiment, in which FIG. 10A is a front view, and FIG. 10B is a rear view. FIG. 11 is a sectional view along A-A line in FIG. 10A.

The camera 1 is an electronic still camera equipped with the zoom lens system according to Example 1 as a photo-taking lens 2 as shown in FIGS. 10A, 10B, and 11.

In an electronic still camera 1 according to the present embodiment, when a power switch button (not shown) is pressed, a shutter (not shown) is opened. Accordingly, light from an object (not shown) is incident on the image-taking lens 2, deflected by a rectangular prism P in the image-taking lens 2 at substantially 90 degrees as shown in FIG. 11, and an image is formed on an imaging device C disposed on an image plane I. The object image formed on the imaging device C is captured and displayed on a liquid crystal monitor 3 disposed backside of the electronic still camera 1. After fixing the composition of the object image with observing the liquid crystal monitor 3, a photographer depresses a release button 4 to take a picture of the object image by the imaging device C, and stores in a memory (not shown). In this manner, the photographer can take a picture of the object by the camera 1.

Moreover, in the electronic still camera 1, the following members are disposed such as an auxiliary light emitter 5 that emits auxiliary light when the object is dark, a W-T button 6 that makes the zoom lens system carry out zooming from a wide-angle end state (W) to a telephoto end state (T), and a function button 7 that is used for setting various conditions of the electronic still camera 1.

A zoom lens system according to Example 1 installed in the camera 1 as an image-taking lens 2 having the specific lens configuration as described above in Example 1 makes it possible to provide a high optical performance zoom lens system with a high zoom ratio and compactness suitable for a highly integrated electronic imaging device. Accordingly, the camera 1 is suitable for a highly integrated electronic imaging device and makes it possible to accomplish a high zoom ratio and compactness.

It is needless to say that a camera equipped with a zoom lens system according to Example 2 or 3 makes it possible to take the same effect as the above-described case.

As described above, the present embodiment can provide a zoom lens system, an imaging apparatus, a method for zooming the zoom lens system, and a method for vibration reduction of the zoom lens system.

What is claimed is:

1. A zoom lens system comprising, in order from an object along an optical axis:
    a first lens group having positive refractive power;
    a second lens group having negative refractive power;
    a third lens group having positive refractive power;
    a fourth lens group having positive refractive power; and
    a fifth lens group having negative refractive power,
    upon zooming from a wide-angle end state to a telephoto end state, the second lens group and the fourth lens group being moved along the optical axis,
    the first lens group including, in order from the object along the optical axis, a front lens group having negative refractive power, an optical-path-bending element for bending an optical path, and a rear lens group having positive refractive power,
    the third lens group including a plurality of lenses, and
    the following conditional expression being satisfied:

$$0.75 < (fw \cdot ft)^{1/2}/(-fn1) < 0.95$$

where fw denotes a focal length of the zoom lens system in the wide-angle end state, ft denotes a focal length of the zoom lens system in the telephoto end state, and fn1 denotes a focal length of the front lens group in the first lens group.

2. The zoom lens system according to claim 1, wherein the following conditional expression is satisfied:

$$0.3 < f1/ft < 0.6$$

where f1 denotes a focal length of the first lens group, and ft denotes a focal length of the zoom lens system in the telephoto end state.

3. The zoom lens system according to claim 1, wherein upon zooming from the wide-angle end state to the telephoto end state, the first lens group, and the third lens group, and the fifth lens group are fixed with respect to the image plane.

4. The zoom lens system according to claim 1, wherein focusing from an infinity object to a close object is carried out by moving the fourth lens group along the optical axis.

5. The zoom lens system according to claim 1, wherein the following conditional expression is satisfied:

$$1.0 < \beta T5 < 1.5$$

where $\beta T5$ denotes an imaging magnification of the fifth lens group upon focusing on an infinity object in the telephoto end state.

6. The zoom lens system according to claim 1, wherein the fifth lens group consists of only one cemented lens.

7. The zoom lens system according to claim 1, wherein variation in an imaging position caused by a camera shake is corrected by moving the third lens group in a direction substantially perpendicular to the optical axis.

8. An imaging apparatus equipped with the zoom lens system according to claim 1.

9. The zoom lens system according to claim 1, wherein the third lens group includes a single lens having positive refractive power and a cemented lens.

10. The zoom lens system according to claim 1, wherein upon zooming from the wide-angle end state to the telephoto end state, the fifth lens group is fixed with respect to the image plane.

11. The zoom lens system according to claim 1, wherein the following conditional expression is satisfied:

$$0.3 < f1/ft < 0.48$$

where f1 denotes a focal length of the first lens group, and ft denotes a focal length of the zoom lens system in the telephoto end state.

12. The zoom lens system according to claim 1, wherein the following conditional expression is satisfied:

$$0.85 \leq (fw \times ft)^{1/2}/(-fn1) < 0.95.$$

13. The zoom lens system according to claim 1, wherein the third lens group is movable in a direction substantially perpendicular to the optical axis.

14. The zoom lens system according to claim 13, wherein the following conditional expression is satisfied:

$$1.0 < (1-\beta 3T) \cdot \beta rT < 1.8$$

where $\beta 3T$ denotes an imaging magnification of the third lens group upon focusing on an infinity object in the telephoto end state, and $\beta rT$ denotes a combined imaging magnification of lens groups disposed to the image side of the third lens group.

15. The zoom lens system according to claim 13, wherein the following conditional expression is satisfied:

$$-0.2 < 1/\beta 3T < 0.2$$

where $\beta 3T$ denotes an imaging magnification of the third lens group upon focusing on an infinity object in the telephoto end state.

16. The zoom lens system according to claim 13, wherein the following conditional expression is satisfied:

$$0.3 < f1/ft < 0.6$$

where f1 denotes a focal length of the first lens group, and ft denotes a focal length of the zoom lens system in the telephoto end state.

17. The zoom lens system according to claim 13, wherein upon zooming from the wide-angle end state to the telephoto end state, the first lens group, the third lens group, and the fifth lens group are fixed with respect to the image plane.

18. The zoom lens system according to claim 13, wherein focusing from an infinity object to a close object is carried out by moving the fourth lens group along the optical axis.

19. The zoom lens system according to claim 13, wherein the following conditional expression is satisfied:

$$1.0 < \beta 3T5 < 1.5$$

where $\beta T5$ denotes an imaging magnification of the fifth lens group upon focusing on an infinity object in the telephoto end state.

20. A zoom lens system comprising, in order from an object along an optical axis:
a first lens group having positive refractive power;
a second lens group having negative refractive power;
a third lens group having positive refractive power;
a fourth lens group having positive refractive power; and
a fifth lens group having negative refractive power,
upon zooming from a wide-angle end state to a telephoto end state, the second lens group and the fourth lens group being moved along the optical axis,
the first lens group including an optical-path-bending element for bending an optical path, and
the third lens group including a plurality of lenses and being movable in a direction substantially perpendicular to the optical axis.

21. The zoom lens system according to claim 20, wherein the following conditional expression is satisfied:

$$1.0 < (1-\beta 3T) \cdot \beta 3rT < 1.8$$

where $\beta 3T$ denotes an imaging magnification of the third lens group upon focusing on an infinity object in the telephoto end state, and $\beta rT$ denotes a combined imaging magnification of lens groups disposed to the image side of the third lens group.

22. The zoom lens system according to claim 20, wherein the following conditional expression is satisfied:

$$0.2 < 1/\beta 3T < 0.2$$

where $\beta 3T$ denotes an imaging magnification of the third lens group upon focusing on an infinity object in the telephoto end state.

23. The zoom lens system according to claim 20, wherein the first lens group includes, in order from the object along the optical axis, a front lens group having negative refractive power, the optical-path-bending element, and a rear lens group having positive refractive power, and the following conditional expressions are satisfied:

$$0.3 < f1/ft < 0.6$$

$$0.75 < (fw \cdot ft)^{1/2}/(-fn1) < 0.95$$

where f1 denotes a focal length of the first lens group, fw denotes a focal length of the zoom lens system in the wide-angle end state, ft denotes a focal length of the zoom lens system in the telephoto end state, and fn1 denotes a focal length of the front lens group in the first lens group.

24. The zoom lens system according to claim 20, wherein upon zooming from the wide-angle end state to the telephoto end state, the first lens group and the third lens group are fixed with respect to the image plane.

25. The zoom lens system according to claim 20, wherein focusing from an infinity object to a close object is carried out by moving the fourth lens group along the optical axis.

26. The zoom lens system according to claim 20, wherein the following conditional expression is satisfied:

$$1.0 < \beta T5 < 1.5$$

where $\beta T5$ denotes an imaging magnification of the fifth lens group upon focusing on an infinity object in the telephoto end state.

27. The zoom lens system according to claim 20, wherein the fifth lens group consists of only one cemented lens.

28. An imaging apparatus equipped with the zoom lens system according to claim 20.

29. The zoom lens system according to claim 20, wherein the third lens group includes a single lens having positive refractive power and a cemented lens.

30. The zoom lens system according to claim 20, wherein upon zooming from the wide-angle end state to the telephoto end state, the fifth lens group is fixed with respect to the image plane.

31. A method for zooming a zoom lens system comprising steps of:
  providing the zoom lens system including, in order from an object along an optical axis, a first lens group having positive refractive power, a second lens group having negative refractive power, a third lens group having positive refractive power and including a plurality of lenses, a fourth lens group having positive refractive power, and a fifth lens group having negative refractive power;
  providing the first lens group including, in order from the object along the optical axis, a front lens group having negative refractive power, an optical-path-bending element for bending an optical path, and a rear lens group having positive refractive power;
  satisfying the following conditional expression:

$$0.75 < (fw \cdot ft)^{1/2}/(-fn1) < 0.95$$

where fw denotes a focal length of the zoom lens system in the wide-angle end state, ft denotes a focal length of the zoom lens system in the telephoto end state, and fn1 denotes a focal length of the front lens group in the first lens group; and
  moving the second lens group and the fourth lens group along the optical axis upon zooming from a wide-angle end state to a telephoto end state.

32. The method according to claim 31, further comprising a step of:
  satisfying the following conditional expression:

$$0.3 < f1/ft < 0.6$$

where f1 denotes a focal length of the first lens group, and ft denotes a focal length of the zoom lens system in the telephoto end state.

33. The method according to claim 31, further comprising a step of:
  fixing the first lens group and the third lens group with respect to an image plane upon zooming from the wide-angle end state to the telephoto end state.

34. The method according to claim 31, further comprising a step of:
  moving the third lens group in a direction substantially perpendicular to the optical axis.

35. A method for zooming a zoom lens system comprising steps of:
  providing the zoom lens system including, in order from an object along an optical axis, a first lens group having positive refractive power, a second lens group having negative refractive power, a third lens group having positive refractive power and including a plurality of lenses, a fourth lens group having positive refractive power, and a fifth lens group having negative refractive power;
  providing the first lens group including an optical-path-bending element for bending an optical path;
  moving the third lens group in a direction substantially perpendicular to the optical axis; and
  moving the second lens group and the fourth lens group along the optical axis upon zooming from a wide-angle end state to a telephoto end state.

* * * * *